(12) United States Patent
Chen

(10) Patent No.: US 8,177,270 B2
(45) Date of Patent: May 15, 2012

(54) DOG FECES COLLECTING DEVICE AND METHOD OF USE THEREOF

(76) Inventor: Mun Seng Chen, Hong Kong (HK)

(*) Notice: Subject to any disclaimer, the term of this patent is extended or adjusted under 35 U.S.C. 154(b) by 0 days.

(21) Appl. No.: 12/876,257

(22) Filed: Sep. 7, 2010

(65) Prior Publication Data

US 2011/0057463 A1    Mar. 10, 2011

Related U.S. Application Data

(60) Provisional application No. 61/241,147, filed on Sep. 10, 2009.

(51) Int. Cl.
*A01K 29/00* (2006.01)

(52) U.S. Cl. .......................................... 294/1.5; 294/1.4

(58) Field of Classification Search ............ 294/1.3–1.5, 294/55; 15/257.1, 257.3, 257.4, 257.7, 257.9; 248/95, 99

See application file for complete search history.

(56) References Cited

U.S. PATENT DOCUMENTS

| | | | | |
|---|---|---|---|---|
| 956,803 A * | 5/1910 | Fromm | | 43/12 |
| 2,064,696 A * | 12/1936 | Smith et al. | | 43/55 |
| 3,562,840 A * | 2/1971 | Meszaros | | 15/257.4 |
| 3,814,359 A * | 6/1974 | Powell | | 248/99 |
| 4,852,924 A * | 8/1989 | Ines | | 294/1.5 |
| 5,082,219 A * | 1/1992 | Blair | | 248/99 |
| 5,588,622 A * | 12/1996 | Gordon, Sr. | | 248/99 |
| 5,641,138 A * | 6/1997 | Cronk et al. | | 248/99 |
| 5,718,469 A * | 2/1998 | Ockerman | | 294/1.4 |
| 6,149,214 A * | 11/2000 | Kipka et al. | | 294/1.5 |
| 6,517,034 B1* | 2/2003 | Kinchen | | 248/99 |
| 6,942,264 B1* | 9/2005 | Mendez | | 294/1.5 |
| 7,407,207 B2* | 8/2008 | Yilmaz | | 294/1.4 |
| 2009/0045639 A1* | 2/2009 | Shalhoub | | 294/1.5 |
| 2009/0102211 A1* | 4/2009 | Antar | | 294/1.3 |

* cited by examiner

*Primary Examiner* — Paul T Chin

(57) ABSTRACT

A dog feces collecting device includes two loops and a plurality of connecting members for holding the two loops together forming a plurality of bag-clamping sections each comprising two loop segments. A rim portion of a bag is inserted between the two loop segments of each bag-clamping section. The two loops are hinged connected to a telescopic shaft. A method of collecting dog feces is also disclosed.

33 Claims, 20 Drawing Sheets

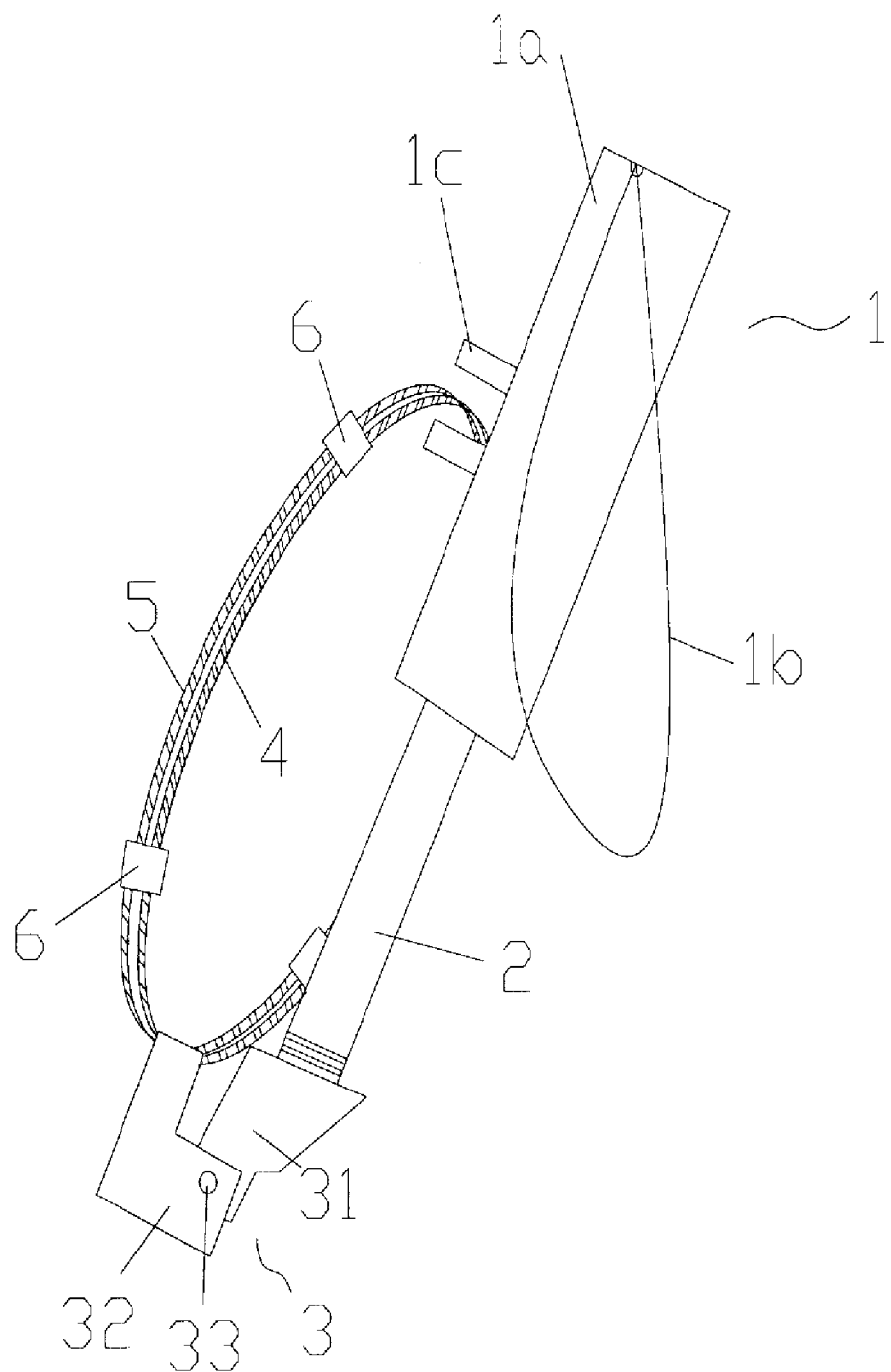
Figure 1.1

DOG FECES COLLECTING DEVICE AND METHOD OF USE THEREOF

CROSS-REFERENCE TO RELATED APPLICATIONS

This application claims the benefit of U.S. Provisional Patent Application Ser. No. 61/241,147, filed on Sep. 10, 2009, the content of which is hereby incorporated by reference.

FIELD OF THE PATENT APPLICATION

The present application relates to a dog feces collecting device. The present application also relates to a method of collecting dog feces.

BACKGROUND

Looking at the figures of the population of pet dog in the modern cities and countries, one could be sure that urgency is needed to solve a problem for all dog owners. During their dog's walks, almost all of them still have to squad down using old newspaper to collect or pick up their pets' feces. Up to now, there is no other better way.

Many devices had been invented but none was widely used or accepted and well known in this field. The reason is very simple. The existing devices are either too complicated, clumsy or uncomfortable to use.

There is a need to provide a dog feces collecting device can be (i) short in length, but could be extended, (ii) handy and convenient to work with, (iii) small, light and portable, (iv) easy to operate, and (v) economical.

The above description of the background is provided to aid in understanding a dog feces collecting device, but is not admitted to describe or constitute pertinent prior art to the dog feces collecting device disclosed in the present application.

SUMMARY

According to one aspect, there is provided a dog feces collecting device including (i) first and second loops having substantially the same size and shape, and disposed in a superimposed position; (ii) a plurality of connecting members provided along the superimposed first and second loops and spaced apart from each other for holding the first and second loops together, and formed a plurality of bag-clamping sections each having two loop segments; (iii) a bag having a rim portion inserted between the two loop segments of each bag-clamping section; and (iv) a telescopic shaft adjustable between a contracted position and an extended position, the first and second loops being hingedly connected to a lower end of the telescopic shaft and moveable between a folded position and an unfolded position.

According to another aspect, there is provided a pet feces collecting device including (i) first and second loops disposed in a superimposed position; and (ii) a plurality of connecting members provided along the superimposed first and second loops and spaced apart from each other for holding the first and second loops together, and formed a plurality of bag-clamping sections each having two loop segments for clamping therebetween a rim portion of a bag positioned around the first and second loops.

In one embodiment, the first and second loops are formed by two plastic rods.

In one embodiment, the first and second loops are formed by two steel wires.

In one embodiment, the first and second loops are formed by a single plastic rod or steel wire bent into two loops.

In one embodiment, the first and second loops are flexible.

In one embodiment, the first and second loops have substantially the size and shape.

In one embodiment, the first and second loops are circular in shape.

In one embodiment, the first and second loops have a diameter of about 25 mm to about 60 mm.

In one embodiment, the first and second loops are oval in shape.

In one embodiment, the connecting members are in the form of metal rings.

In one embodiment, the connecting members are spaced equidistantly apart from each other along the superimposed first and second loops.

In one embodiment, the device includes four connecting members and three bag-clamping sections.

In one embodiment, the bag is a plastic T-shirt bag having two handles.

In one embodiment, the device further includes an elongated member having an upper end and a lower end, the first and second loops being hingedly connected to the lower end of the elongated member and moveable between a folded position and an unfolded position.

In one embodiment, the elongated member includes a plurality of telescopic tubes adjustable between a contracted position and an extended position.

In one embodiment, the device further includes a spring-biased clip having two clip portions for clipping around the lower end of the elongated member, two finger grip portions having two openings respectively through which ends of the first and second loops pass and mount, and a spring for biasing the pair of clip portions in a closed position.

In one embodiment, the device further includes a first hinge member fixed to the lower end of the elongated member, and a second hinge member to which ends of the first and second loops coupled, the first and second hinge members are hingedly connected together by a pin extending through concentric bores of the first and second hinge members transverse to the elongated member.

In one embodiment, the device further includes a stopper for limiting the movement of the first and second loops at the unfolded position.

In one embodiment, the lower end of the elongated member is adapted to rest on the ground when the first and second loops are in the unfolded position.

In one embodiment, the first and second loops are disposed at an angle of about 150 degrees with respect to the elongated member when the first and second loops are in the unfolded position.

In one embodiment, the device further includes a handle mounted at the upper end of the elongated member.

In one embodiment, the device further includes a hanging rope attached to the handle.

In one embodiment, the device further includes a pair of projections formed on the handle for positioning the first and second loops in the folded position where the first and second loops dispose adjacent and generally parallel to the elongated member.

According to yet another aspect, there is provided a method of collecting dog feces including the steps of (i) providing first and second loops having substantially the same size and shape, and disposed in a superimposed position, a plurality of connecting members being provided along the superimposed first and second loops and spaced apart from each other for holding the first and second loops together, and formed a plurality of bag-clamping sections each comprising two loop segments; (ii) providing a bag having an open end and a closed end; (iii) placing the first and second loops into the bag through the open end; (iv) pushing the closed end of the bag towards a central position generally parallel to and at a distance from a central line that bisects the first and second loops until the open end of the bag hang over the side of the first and second loops; and (iv) inserting a rim portion of the bag between the two loop segments of each bag-clamping section.

In one embodiment, the inserting step includes the step of inserting the rim portions of the bag between the first and second loops at the bag-clamping sections by a hand.

In one embodiment, the inserting step includes the step of inserting the rim portions of the bag between the first and second loops at the bag-clamping sections by a thin object.

In one embodiment, the method further includes the steps of (i) pulling two handles of the bag away from the first and second loops thereby releasing the clamped rim portions of the bag from the bag-clamping sections after feces collection; (ii) tying one or more knots with the two handles of the bag to close the bag; and (iii) disposing the closed bag in a litter container.

In one embodiment, the method further includes the steps of (i) providing a telescopic shaft having an upper end and a lower end; (ii) adjusting the telescopic shaft to a suitable length; (iii) holding the upper end of the telescopic shaft with one hand; and (iv) positioning the first and second loops, which is hingedly connected to the lower end of the telescopic shaft, underneath the anus of the dog.

In one embodiment, the method further includes the step of holding the telescopic shaft an angle of about 30 degrees to about 80 degrees with respect to the ground.

In one embodiment, the method further includes the step of holding the telescopic shaft and standing at a position at an angle of about 45 degrees with respect to the tail of the dog.

In one embodiment, the method further includes the step of providing a first hinge member fixed to the lower end of the telescopic shaft, and a second hinge member to which ends of the first and second loops coupled, the first and second hinge members being hingedly connected together by a pin extending through concentric bores of the first and second hinge members transverse to the telescopic shaft so that the first and second loops automatically drops to the unfolded position and stops by a stopper defined by the first hinge member.

In one embodiment, the method further includes the steps of (i) providing a spring-biased clip having two clip portions for clipping around the lower end of the telescopic shaft, two finger grip portions having two openings respectively through which ends of the first and second loops pass and mount, and a spring for biasing the pair of clip portions in a closed position; (ii) resting the lower end of the telescopic shaft on a ground; and (iii) adjusting the position of the clip on the telescopic shaft until the first and second loops are disposed in a desired unfolded position.

Although the dog feces collecting device disclosed in the present application is shown and described with respect to certain embodiments, it is obvious that equivalents and modifications will occur to others skilled in the art upon the reading and understanding of the specification. The present application includes all such equivalents and modifications, and is limited only by the scope of the claims.

BRIEF DESCRIPTION OF THE DRAWINGS

Specific embodiments of the dog feces collecting device disclosed in the present application will now be described by way of example with reference to the accompanying drawings wherein:

FIG. 1.1 is a perspective view of the dog feces collecting device of FIG. 1 in a folded and contracted position;

DETAILED DESCRIPTION

Reference will now be made in detail to a preferred embodiment of the dog feces collecting device disclosed in the present application, examples of which are also provided in the following description. Exemplary embodiments of the dog feces collecting device disclosed in the present application are described in detail, although it will be apparent to those skilled in the relevant art that some features that are not particularly important to an understanding of the dog feces collecting device may not be shown for the sake of clarity.

Furthermore, it should be understood that the dog feces collecting device disclosed in the present application is not limited to the precise embodiments described below and that various changes and modifications thereof may be effected by one skilled in the art without departing from the spirit or scope of the appended claims. For example, elements and/or features of different illustrative embodiments may be combined with each other and/or substituted for each other within the scope of the disclosure.

FIGS. 1-4 show a first embodiment of a dog feces collecting device 1. The dog feces collecting device 1 may include a telescoping shaft 2, a hinge mechanism 3, and two loops 4, 5. Although it is shown and described that the device is for collecting feces of dogs, it is understood that the device can be used for collecting feces of any other animal and pet such as cats.

Figure 1:
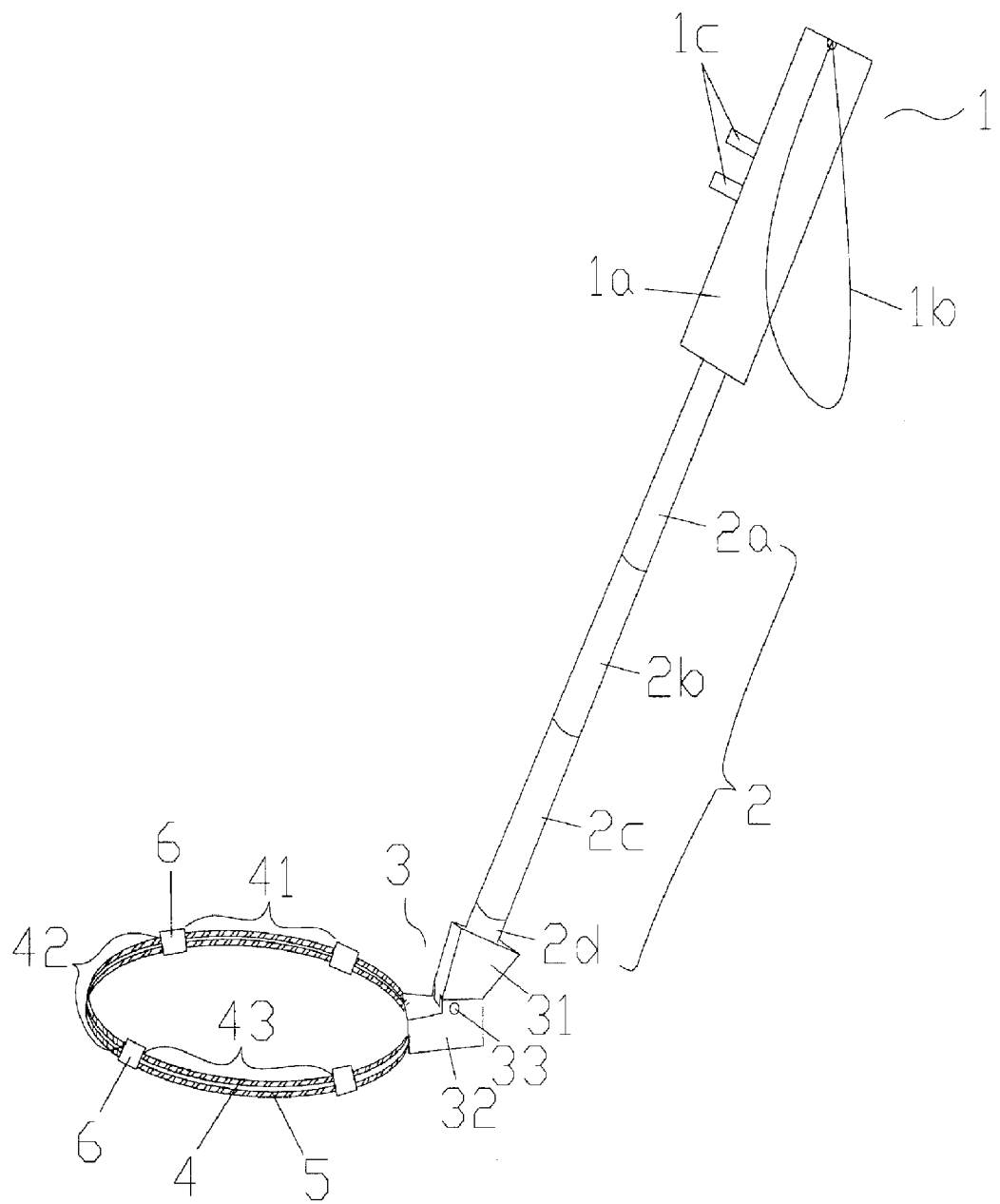
FIG. 1 is a perspective view of a dog feces collecting device in an unfolded and expanded position according to an embodiment disclosed in the present application.
Figure 2:
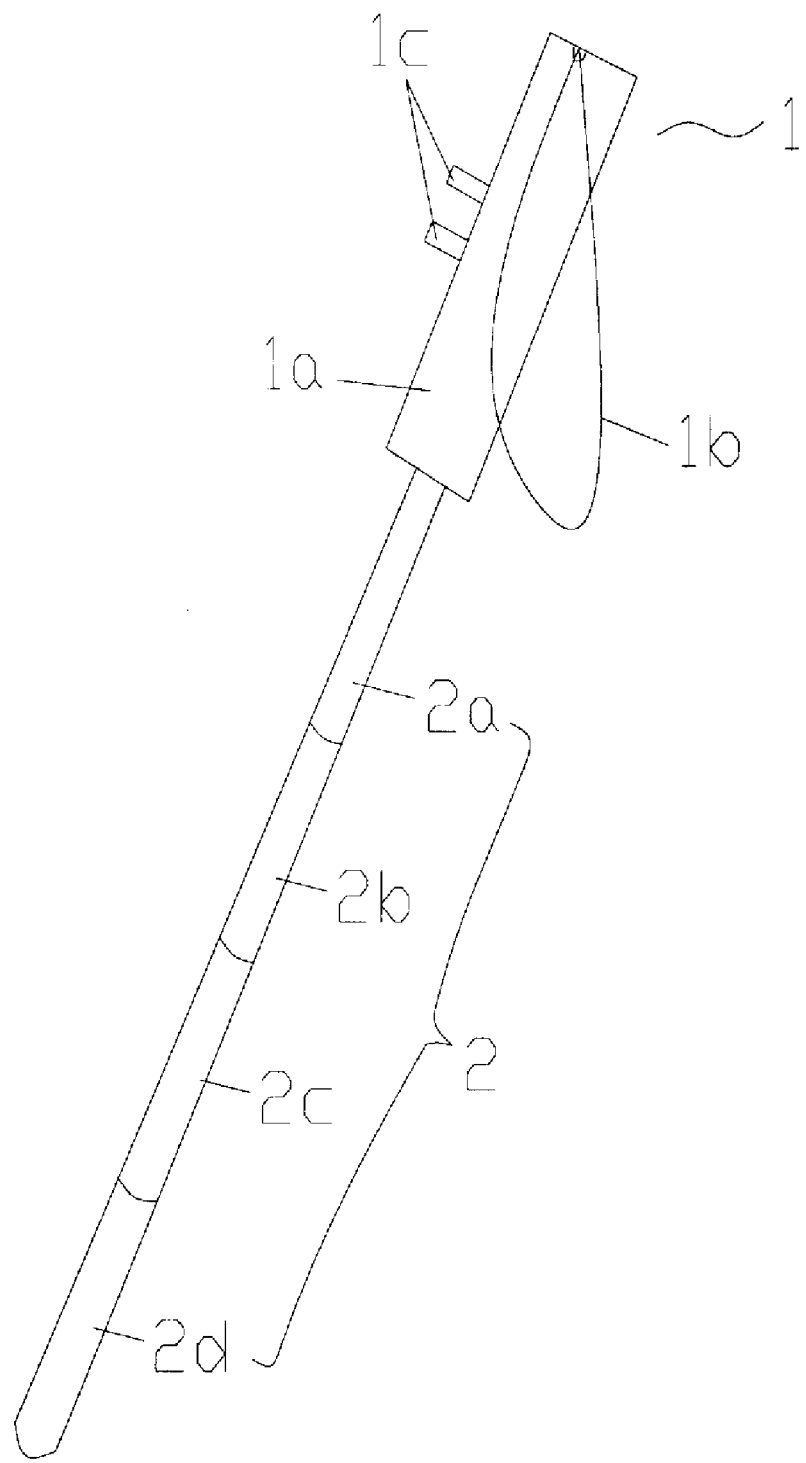
FIG. 2 is a perspective view of a telescoping shaft of the dog feces collecting device.

FIG. 1 shows the dog feces collecting device 1 in an unfolded and extended position; and FIG. 1.1 shows the dog feces collecting device 1 in a folded and contracted position. The telescoping shaft 2 may include a handle 1a at the shaft's upper end. A hanging rope 1b may be fixed to a top of the handle 1a. The telescoping shaft 2 may be formed of a plurality of tubes or pipes. The largest pipe may have a diameter of less than about 1.8 cm. The telescoping shaft 2 may be made of aluminum, titanium, steel or any other suitable material.

The telescoping shaft 2 may have three to six pipes with various diameters. According to the illustrated embodiment, the shaft 2 has four pipes 2a, 2b, 2c and 2d. The pipe 2a at the upper section is the smallest and shortest in length. The pipe 2b at the second section is bigger and slightly longer than the pipe 2a. The pipe 2c at the third section is bigger and slightly longer than the pipe 2b. The largest and the longest pipe 2d is the lowest section of the shaft 2 and may be joined to an end of the pipe 2c. The overall length of the shaft 2 may be less than about 12" when it is in its contracted position. When the telescoping shaft 2 is extended to an extended position, it should not be more than about 36" in length.

Although it has been shown and described that the dog feces collecting device 1 includes a telescopic shaft 2, it is understood any suitable elongated member, such as an elongated rod of a suitable length, may be used.

The loops 4, 5 are hingedly connected to the shaft 2. The loops 4, 5 may be made of plastic rod or steel wire of about 25 mm to 60 mm in diameter (measurement including the outer layer of plastic material wrapping around the steel wire). A single plastic rod or steel wire can be bent to form the two loops 4, 5. Alternatively, two rods or wires may be bent to form the two loops 4, 5 respectively. The loops 4, 5 can be formed into a round shape, or other appropriate shape such as an oval shape. The loops 4, 5 may be made of a resilient material and is flexible. The loops 4, 5 may have substantially the same size and shape, and dispose in a superimposed position.

A plurality of connecting members 6 may be employed to hold the two loops 4, 5 in the superimposed position. According to the illustrated embodiment, there are four metal rings 6 provided along the loops 4, 5. Two or three metal rings 6 may be used for smaller loops. The four metal rings 6 may be provided equidistantly on the loops 4, 5 for holding the loops 4, 5 together, and form three bag-clamping sections 41, 42, 43 on the loops 4, 5. It is understood that other connecting members, such as clips, may be used to connect the loops 4, 5 together in the superimposed position. The connecting members may be formed separately or may be formed integrally on the loops 4, 5.

The loops 4, 5 may have different sizes to suit different sizes of dog. The diameter of the loops 4, 5 may be adjusted by adjusting the ends of the loops 4, 5.

Although it has been shown and described that the loops 4, 5 are made of flexible plastic rod or steel wire and connected by metal rings, it is understood by one skilled in the art that the loops 4, 5 may be non-flexible and the rings may be made of elastic material.

Figure 3:
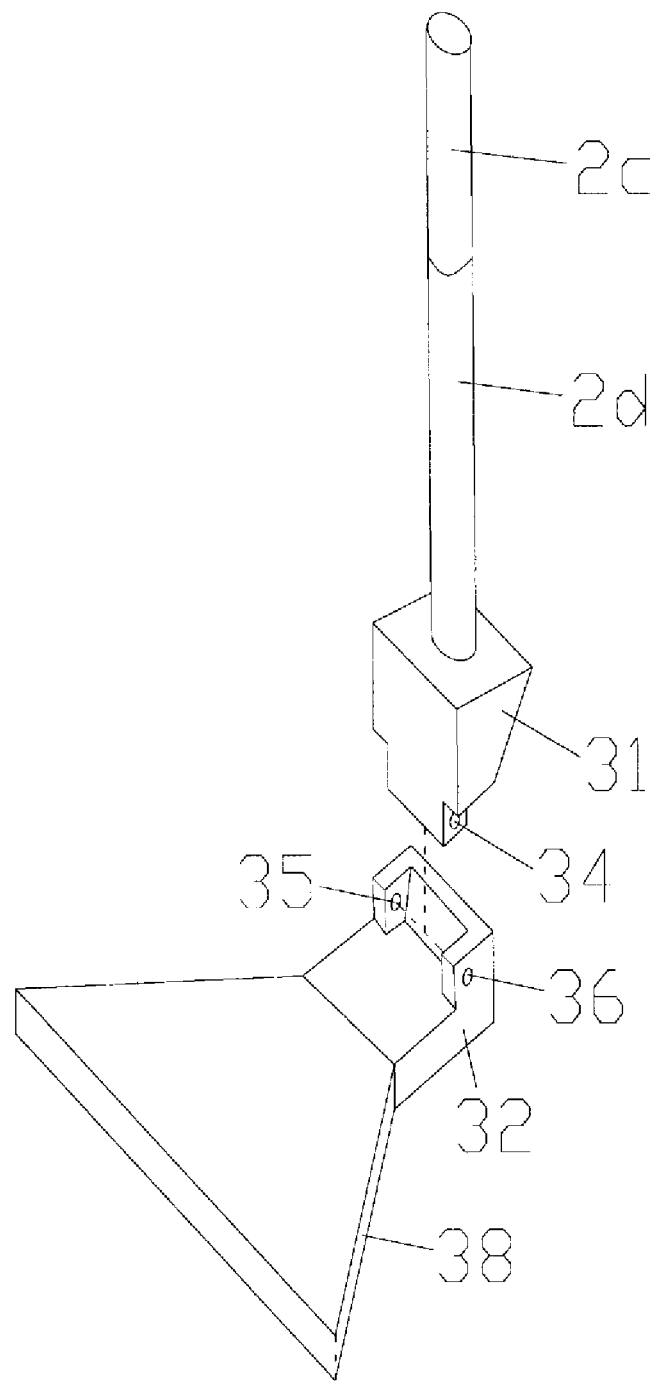
FIG. 3 shows an enlarged perspective view of a hinge mechanism of the dog feces collecting device.
Figure 4:
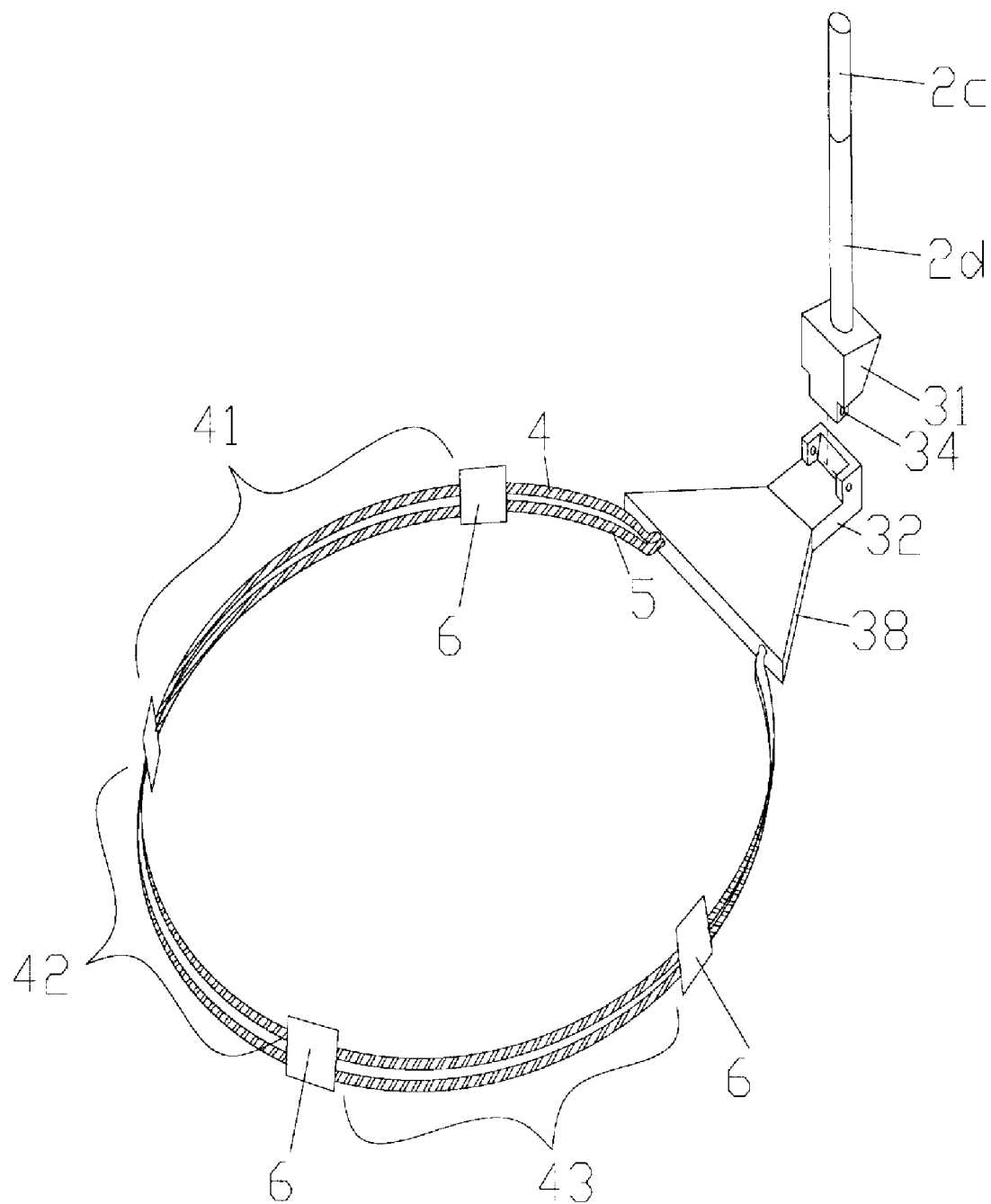
FIG. 4 shows the hinge connection between the telescoping shaft and the loops of the dog feces collecting device.

The loops 4, 5 can be hingedly connected to the shaft 2 by a hinge mechanism 3. According to the illustrated embodiment, the hinge mechanism 3 may include a first hinge member 31 and a second hinge member 32. The first and second hinge members can be hingedly connected together by a pin 33. The pin 33 may extend through a transverse bore 34 formed on the first hinge member 31 and two concentric bores 35, 36 formed on the second hinge member 32. The first hinge member 31 can be attached to the lowest end of the shaft 2. The ends of the loops 4, 5 may be directly attached to the second hinge member 32. Alternatively, the ends of the loops 4, 5 may be attached to an extended portion 38 extending from the second hinge member 32, as depicted in FIG. 3. This extended portion 38 may be sized and shaped, such as trapezoid in shape, to secure the ends of the loops 4, 5 to the hinge mechanism 3.

Figure 5:
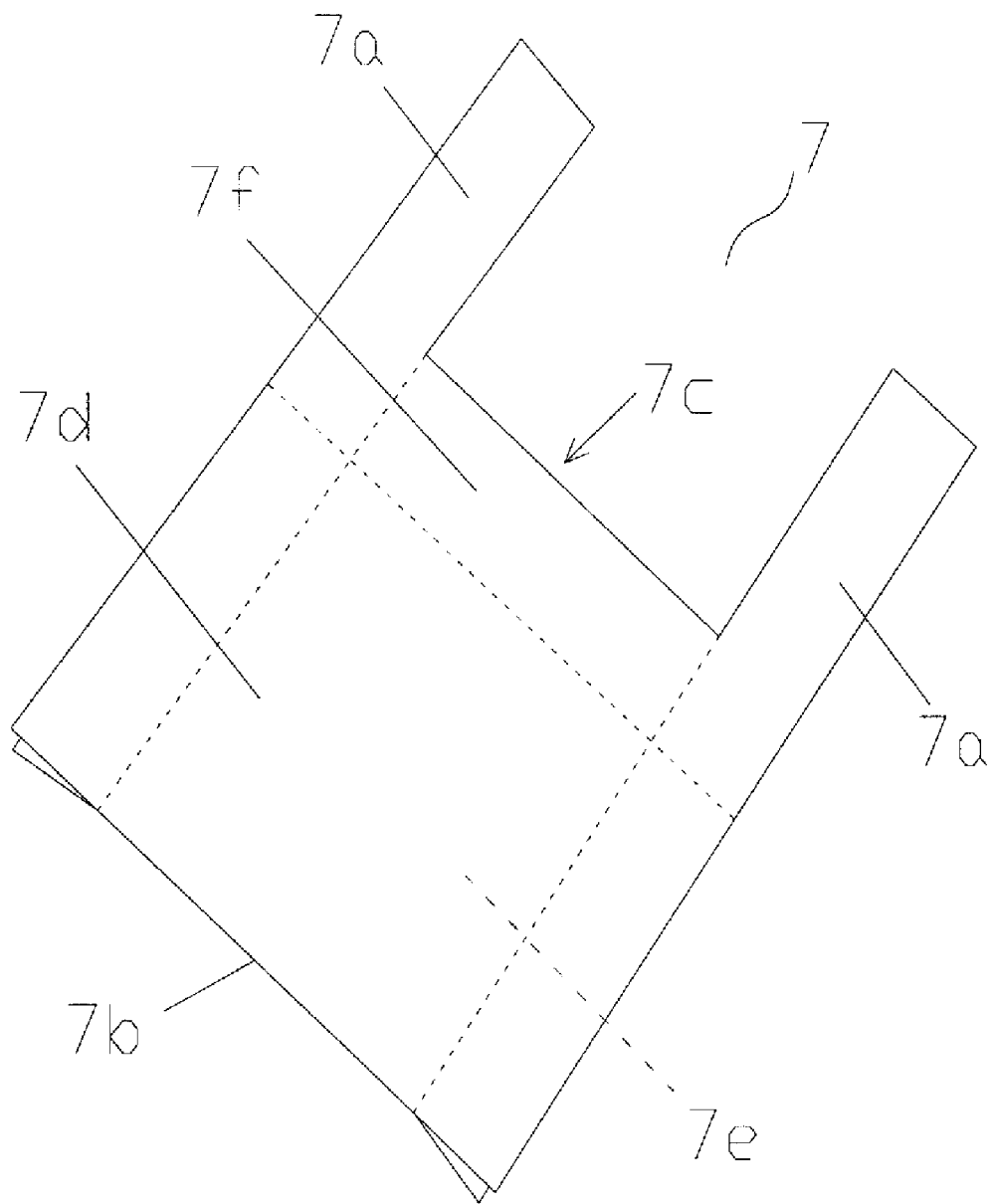
FIG. 5 is a perspective view of a feces collecting bag.

FIG. 5 depicts a perfectible disposable T-shirt bag 7, which can biodegrade during composting. The T-shirt bag 7 may have two considerable long handles 7a, a bottom closed end 7b, an upper open end 7c, two side portions 7d, 7e, and a rim 7f at the open end 7c. It has a size of approximately 12"×6" with an internal extension to 10" on each side. Its peculiar shape is like a man's T-shirt. It is a thin, soft and semi transparent bag but can stand great tension. The size of bag is commonly used in the market. Retailers use it to put small items sold to their customers. Although it is shown and described that a T-shirt bag with handles is used, it is contemplated that a bag without handles may also be used.

FIGS. 6-9 illustrate the steps of wearing or mounting the bag 7 onto the loops 4, 5. To commence, one may take out the dog feces collecting device 1, which may be stored in a carrying bag. The device 1 should be at its folded and contracted position, as shown in FIG. 1.1, in which the loops 4, 5 are folded and rested adjacent and generally parallel to the telescoping shaft 2, and the telescoping shaft 2 is in its contracted position. When the device 1 is being pulled out from the carrying bag, the loops 4, 5 can automatically drop to the unfolded position, as shown in FIG. 1. The lower end of the first hinge member 31 defines as a stopper for limiting the movement of the loops 4, 5 relative to the shaft 2. When the loops 4, 5 are in the unfolded position, it makes an angle of about 150 degrees to the shaft 2.

Figure 6:
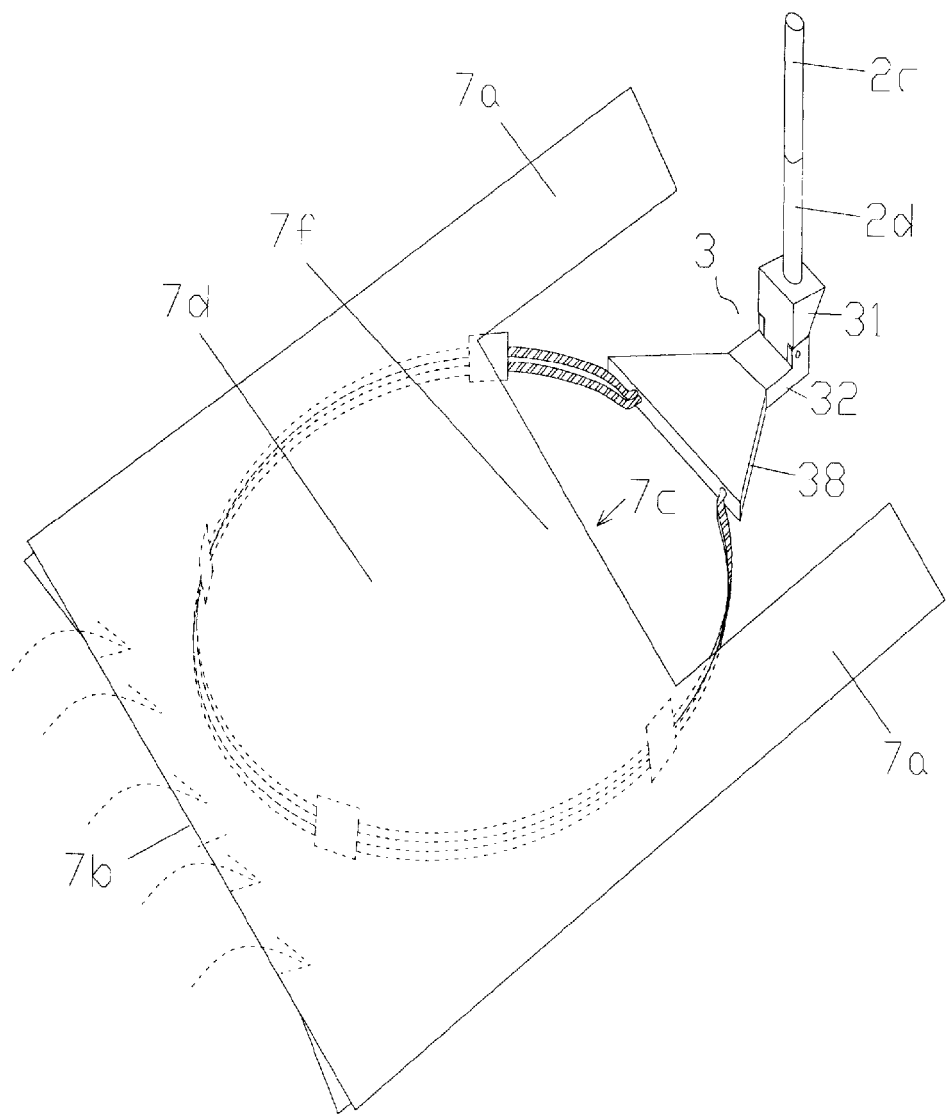
FIGS. 6-9 show the steps of mounting the bag on the loops.
Figure 7:
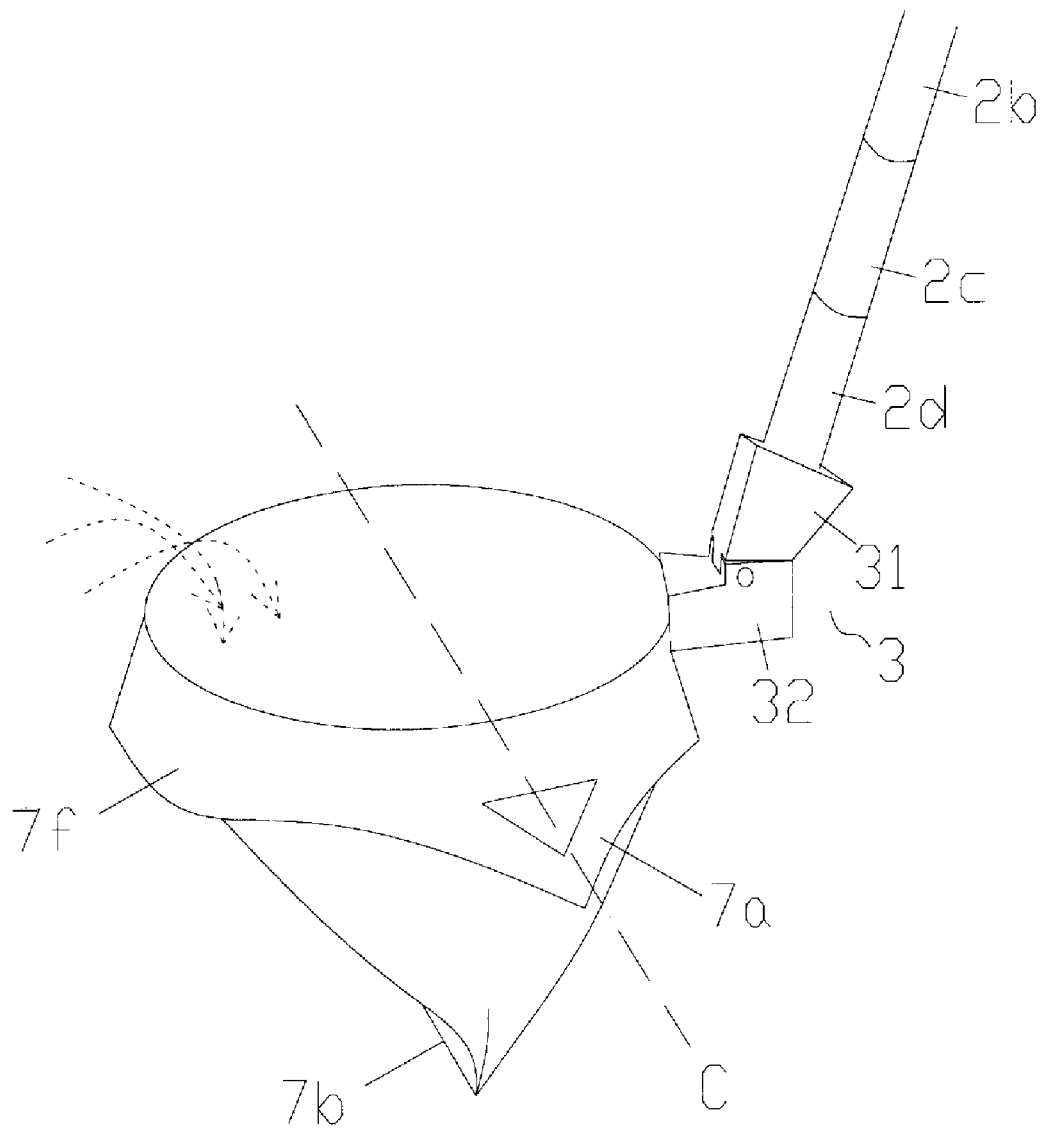
Figure 8:
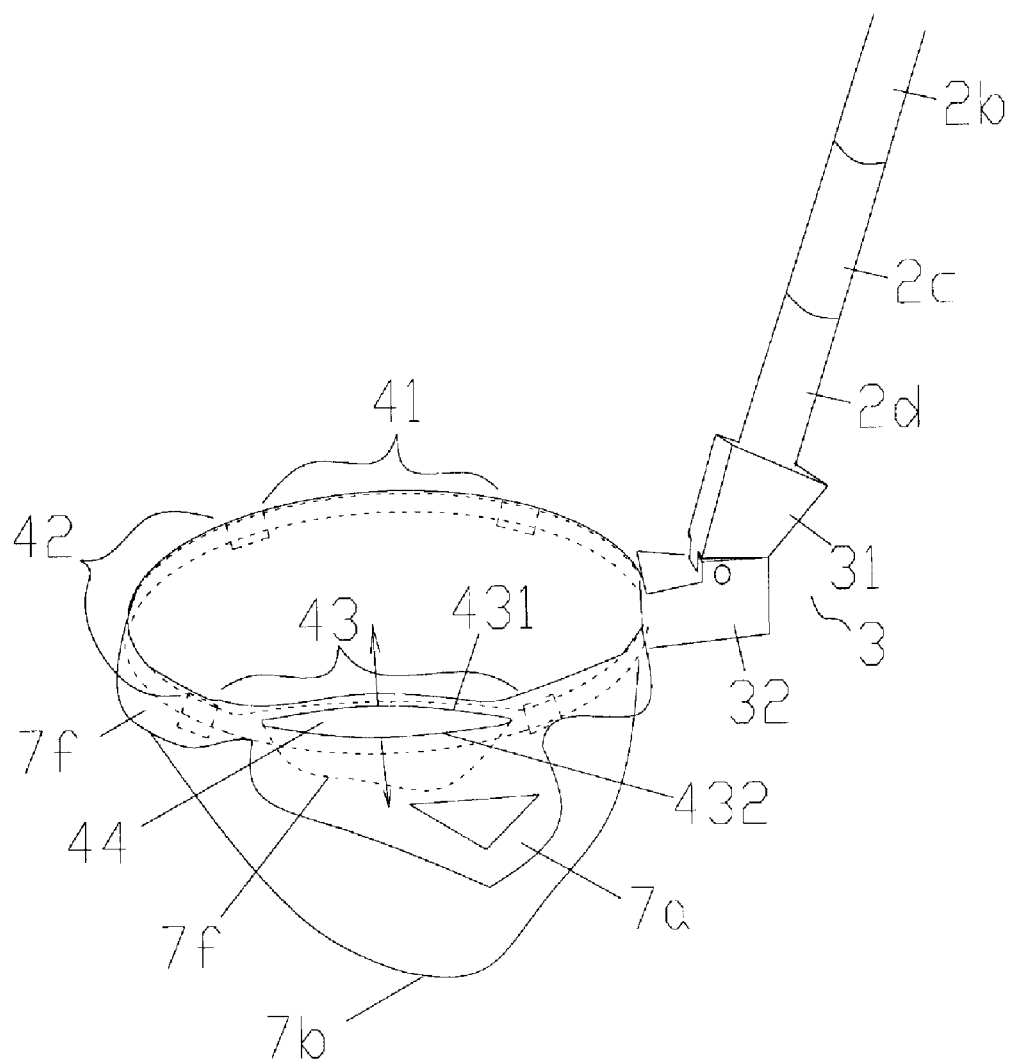

The user can hold the device 1 with one hand, and use the other hand to mount the bag 7 onto the loops 4, 5 until the loops 4, 5 are at the closed end 7b of the bag 7, as illustrated in FIG. 6. At this state, the side portion 7d of the bag 7 should rest on the loops 4, 5. The user can then sink the fingers of a hand and push the closed end 7b downwards at the side portion 7d so that the closed end 7b of the bag 7 moves deep in and towards a central position generally parallel to and at a distance from a center line C that bisects the loops 4, 5, as illustrated by the arrows in FIG. 7, until the rim 7f at the open end 7c of the bag 7 hangs over the side of the loops 4, 5. The two handles 7a will be disposed opposite to each other.

Figure 9:
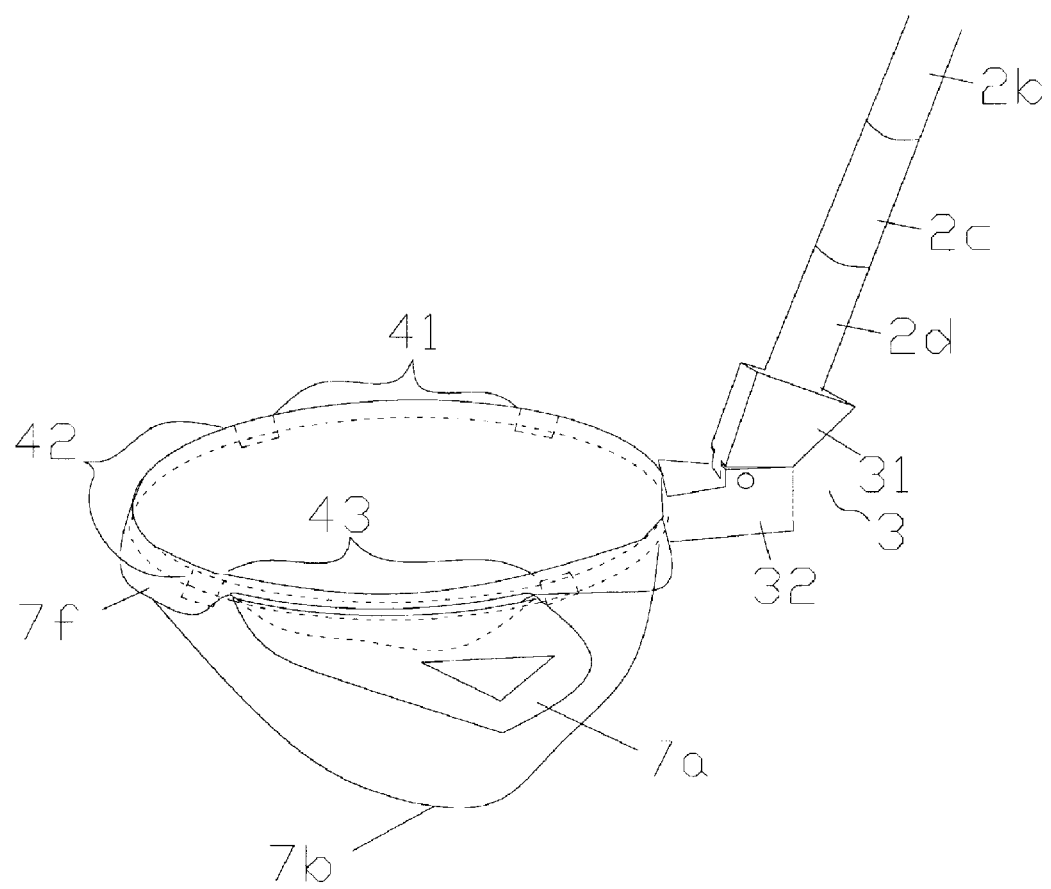

At the bag-clamping sections 41, 42, 43 between two rings 6, by hand or using a thin object insert the rim 7f of the bag 7 marginally in between two loop segments 431, 432 of the loops 4, 5 between the two rings 6 such that the rim 7f can be gently clamped between the two loop segments 431, 432. For example, a thin card of credit card size can be used to insert the rim portions between the two loop segments 431, 432. As the loops 4, 5 are flexible, the gap between the loops 4, 5 can be widened, as illustrated by the arrows in FIG. 8. It is for the convenience of a user to insert the rim 7f of the bag 7 marginally in between the loops 4, 5. The rim 7f can be clamped and secured by the loops 4, 5 if the insertion is done, as shown in FIG. 9.

When the mounting of the bag 7 to the loops 4, 5 is finished, the user can fold up the loops 4, 5 and put it back to its resting and folded position. The device can be put back into the carrying bag ready to be used. It is advisable to mount the bag 7 on the loops 4, 5 in a ready-to-use condition before going out for a dog walk. It will take only a few seconds to complete.

Figure 10:
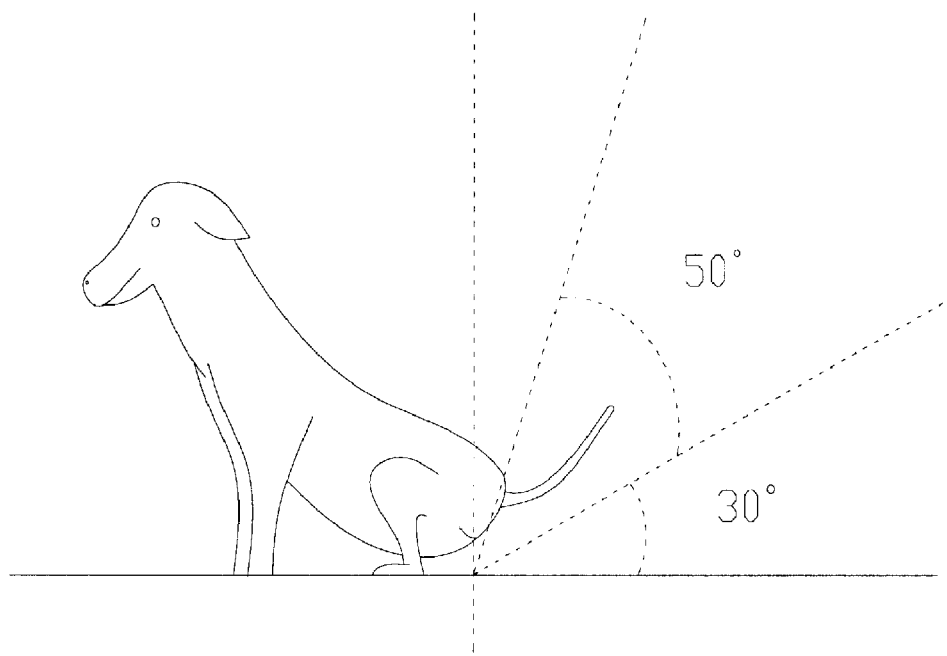
FIGS. 10 and 11 show the positioning of the dog feces collecting device during feces collection.
Figure 11:
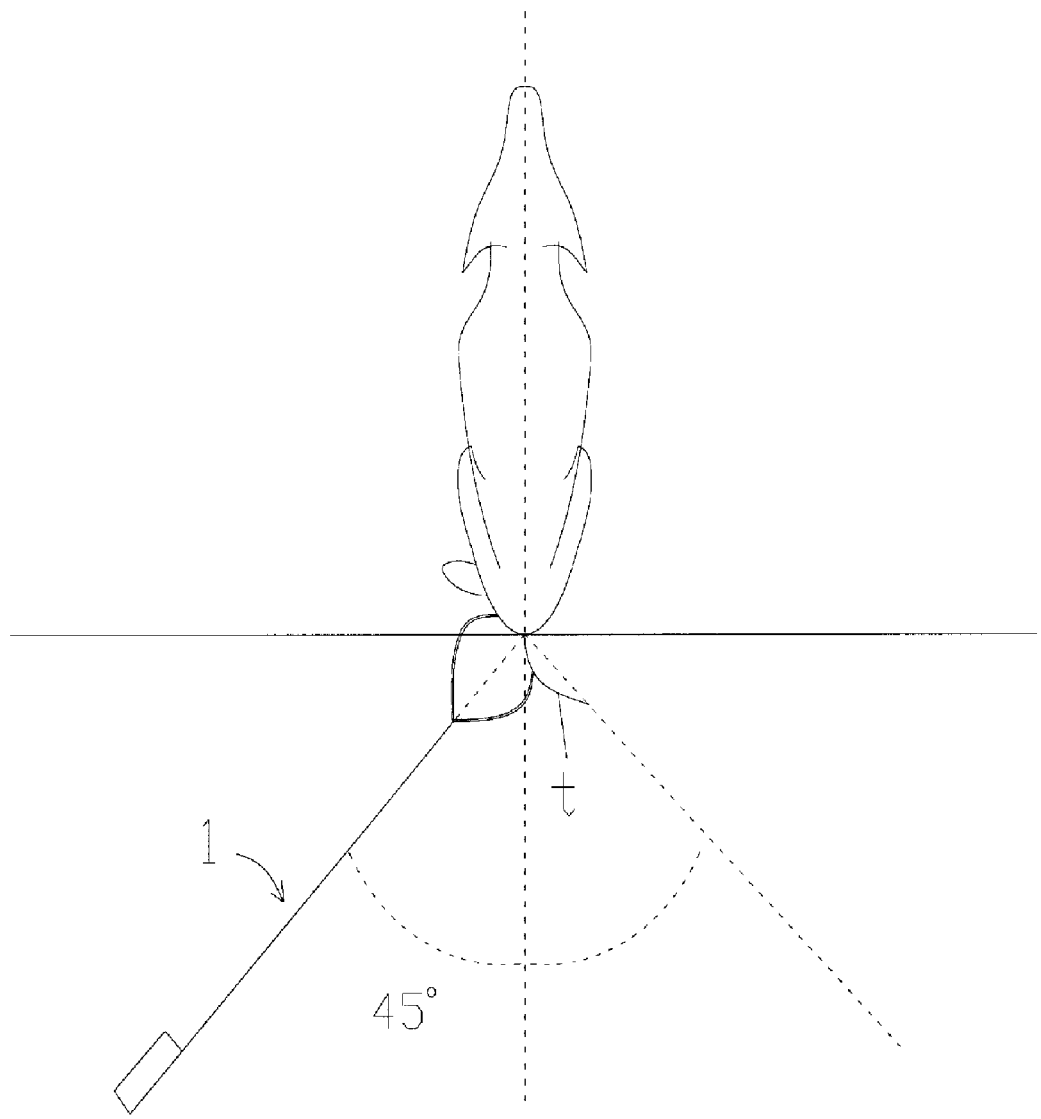
Figure 12:
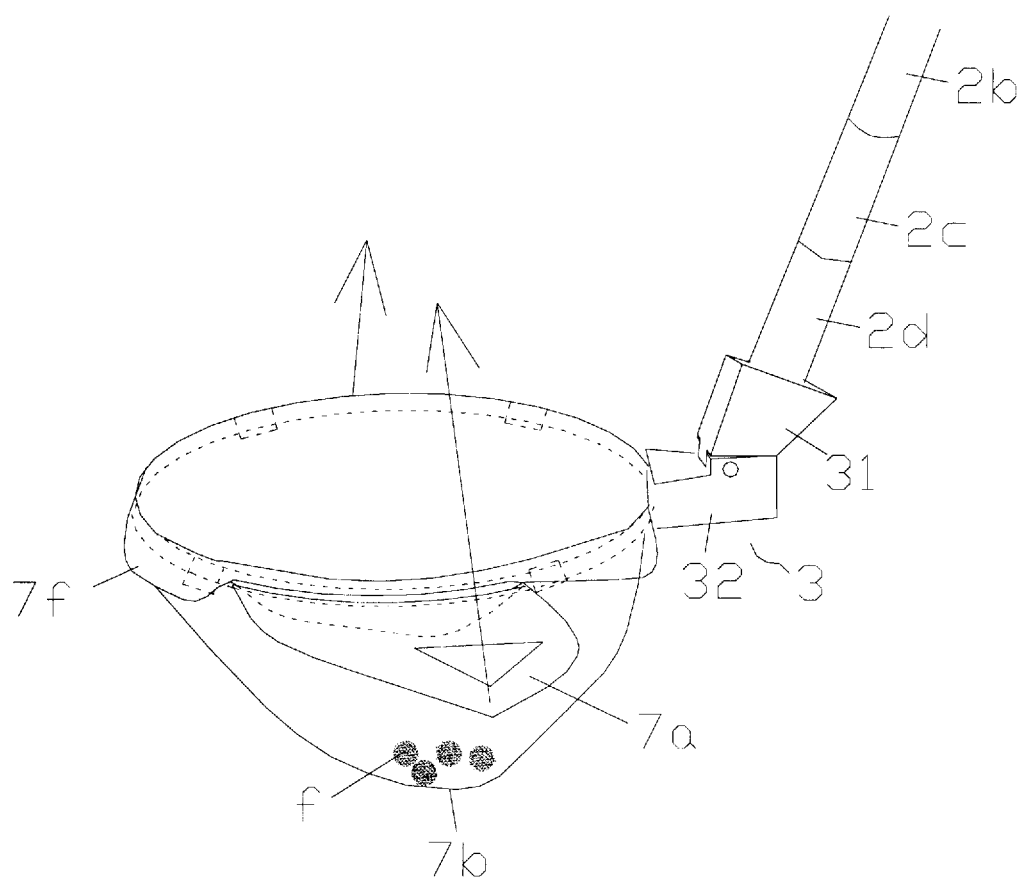
FIGS. 12-15 show the steps of detaching of the bag from the loops after feces collection.
Figure 13:
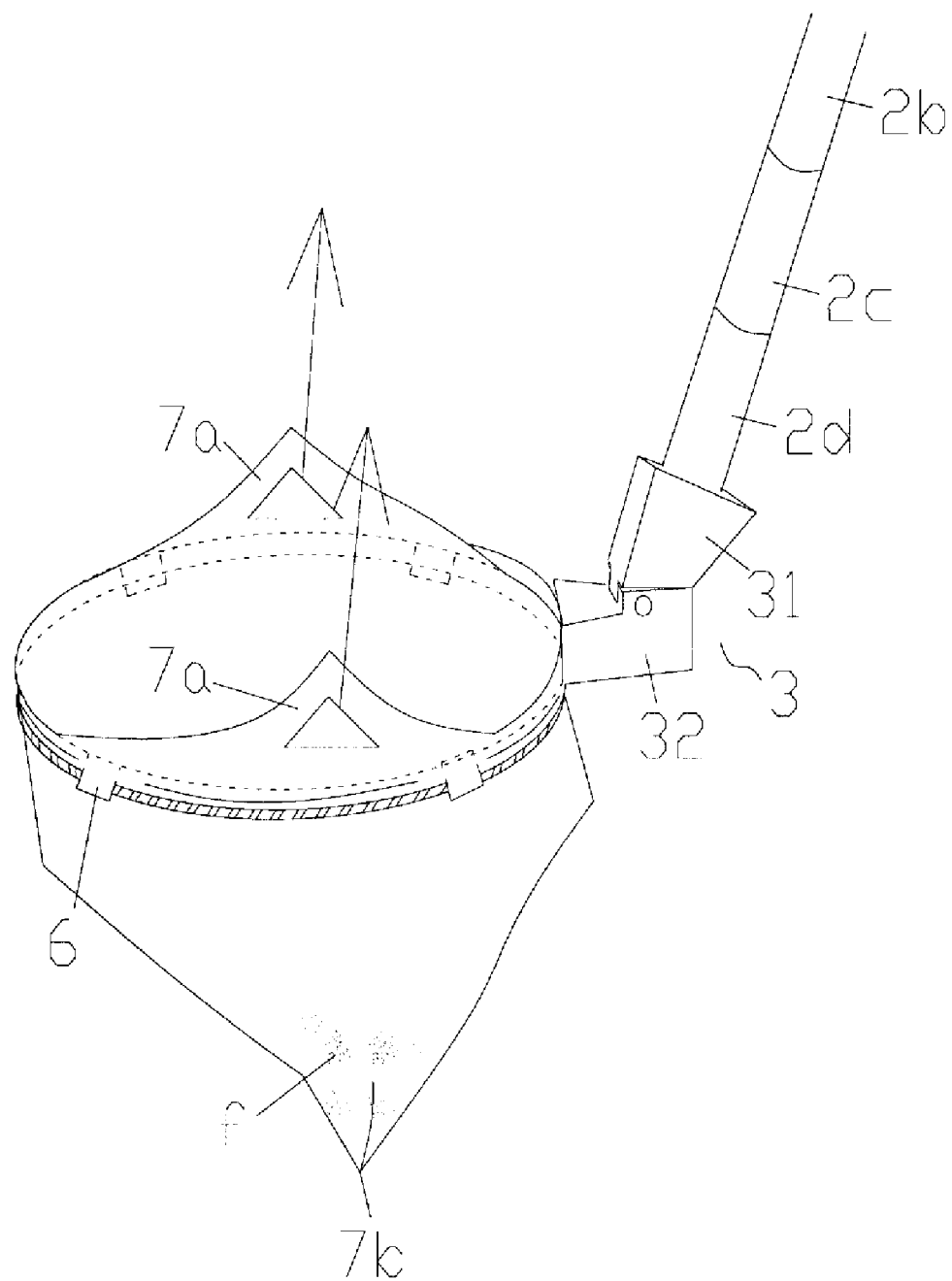
Figure 14:
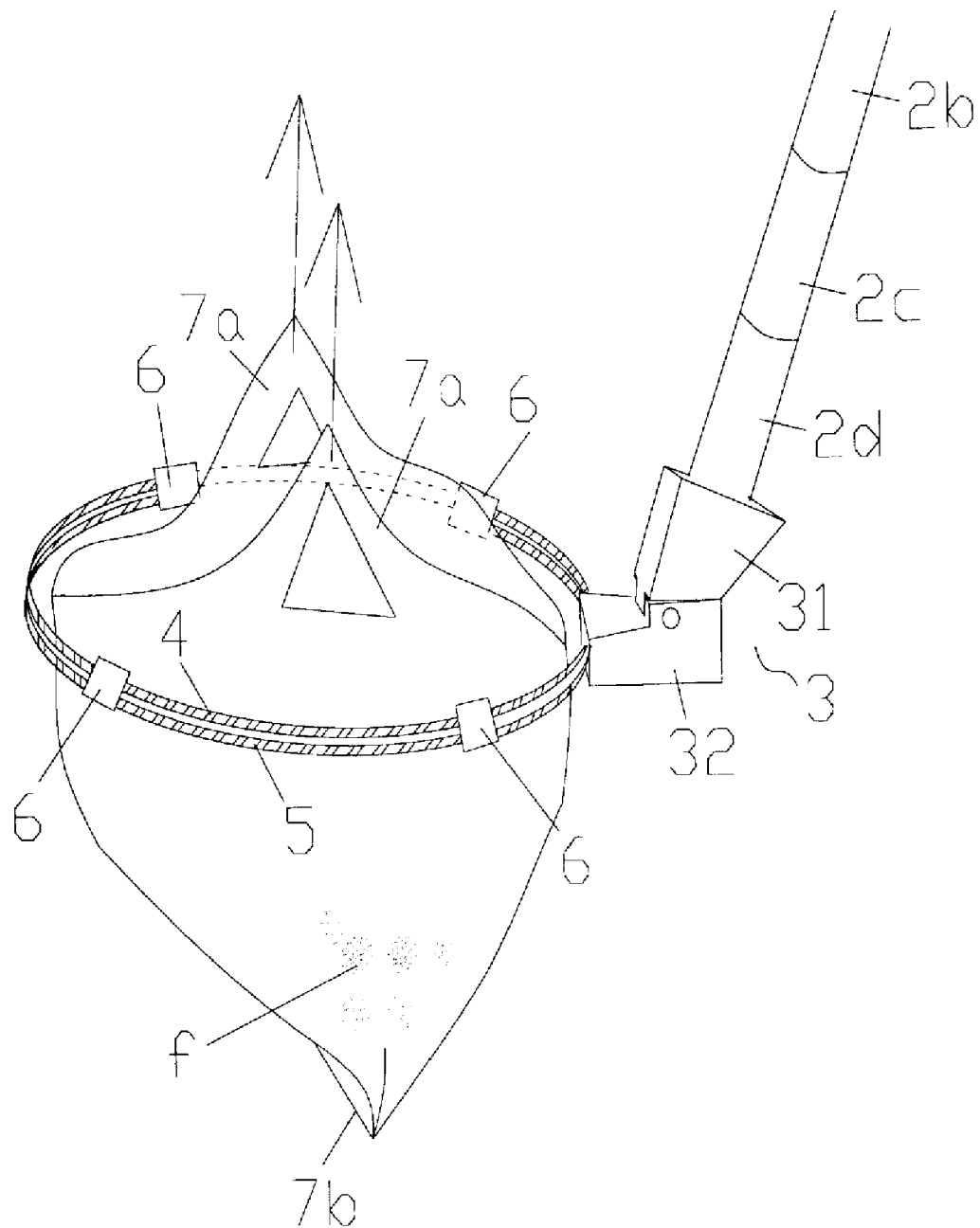
Figure 15:
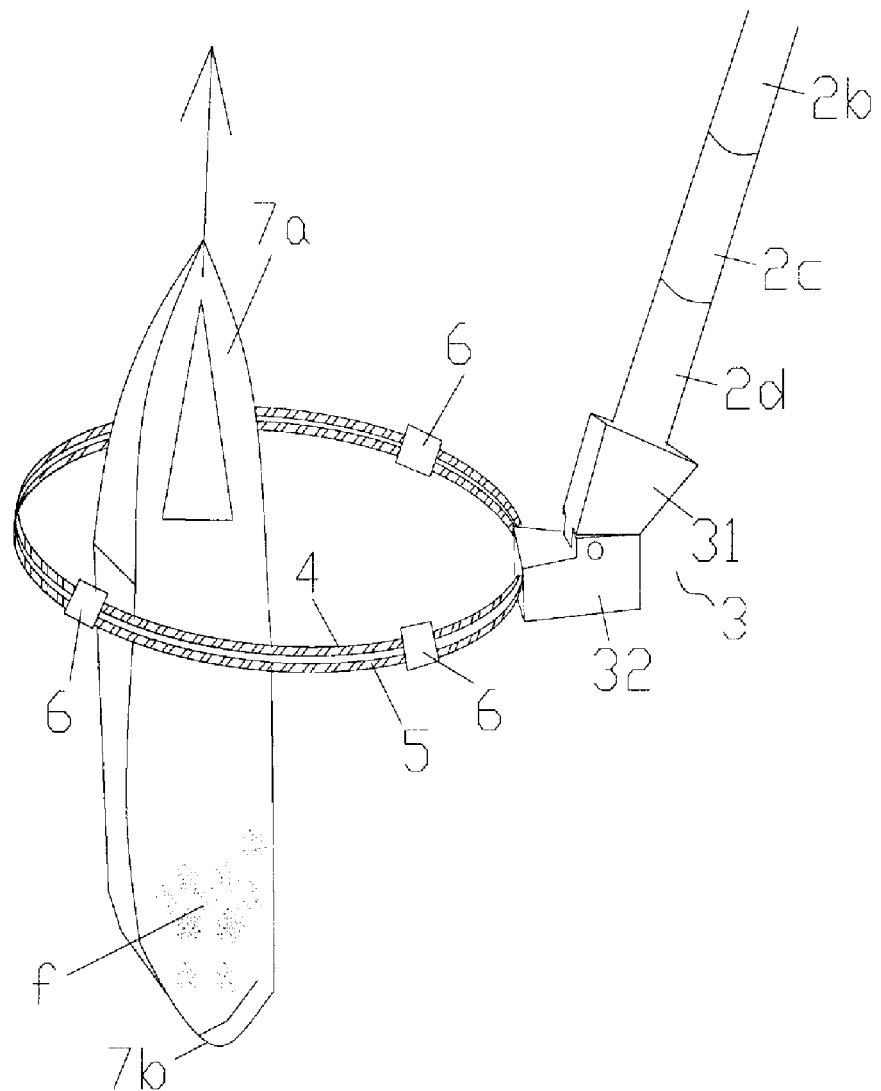

FIGS. 10 and 11 show the positioning of the dog feces collecting device during feces collection.

During a dog walk, once the dog shows a sign of "pooing", pull out the dog feces collecting device 1 from the carrying bag and the loops 4, 5 drops automatically from the folded position to the unfolded position. The user then extends the telescoping shaft 2 to a suitable length. The user can move the extended shaft 2 so as to place the loops 4, 5 underneath the anus of the dog at an angle of about 30 degrees to about 80 degrees from the ground, as illustrated in FIG. 10.

An ideal position to collect the feces is standing at a position at an angle of about 45 degree to the dog's tail, as depicted in FIG. 11. At this angle, one could easily see the feces collecting action. The feces f will be dropped into the bag 7. Since some dogs may move a little bit forwards or backwards, one should adjust the position of the loops 4, 5 whatever it is needed. Once the dog stands up and walks away, the feces collecting process is completed.

FIGS. 12-15 show the final clean up steps. Once the feces f is collected, one should shorten the telescoping shaft 2 and pull the two handles 7a of the bag 7 upwards and detach it from the loops 4, 5, as shown by the arrows. The bag 7 will be gently dragged out from the loops 4, 5. The user then ties one or more knots to the handles 7a in secure to prevent the smell from evaporating out from it. The user then dumps the bag 7 to a nearby public litter containers. The user can mount another bag onto the loops 4, 5 for the next time.

FIGS. 16-19 show a second embodiment of the dog feces collecting device. The loops 4, 5 may be hingedly coupled to the shaft 7 by a spring-biased clip 8.

Figure 16:
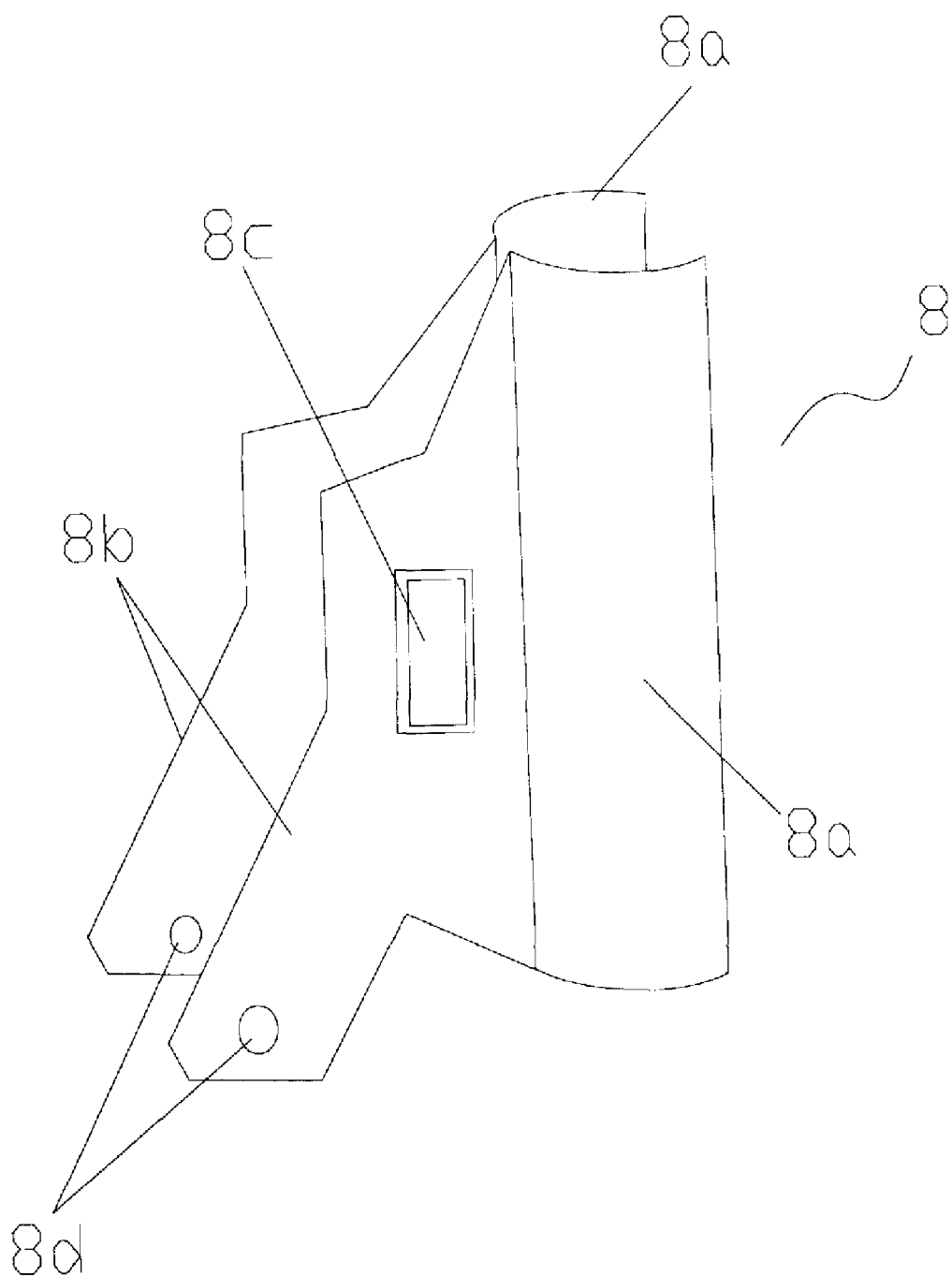
FIGS. 16-19 show a second embodiment of the dog feces collecting device.
Figure 17:
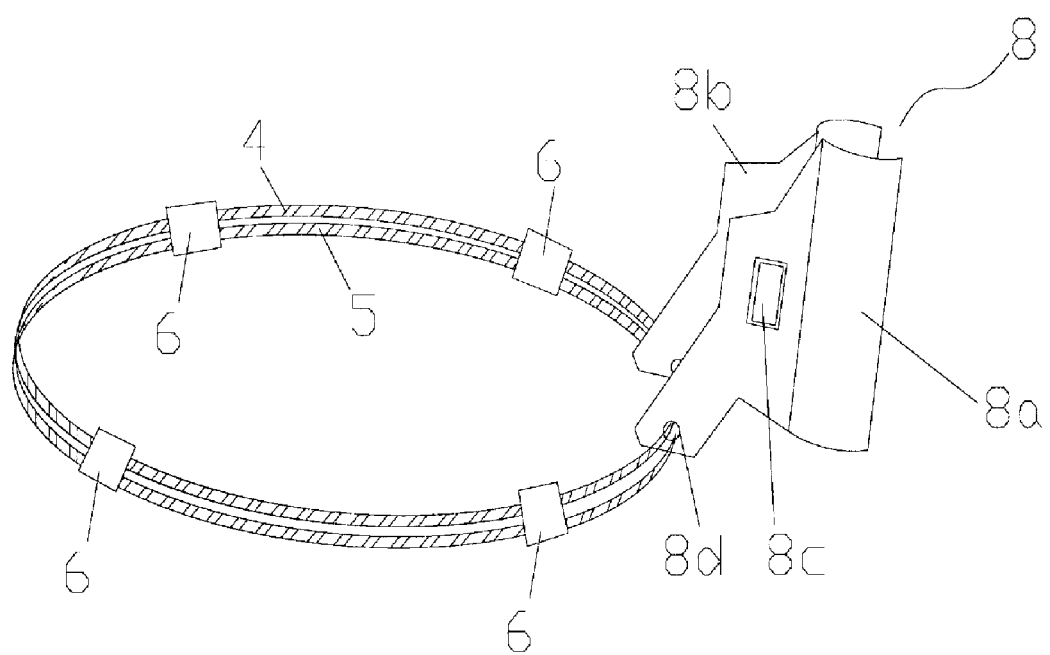
Figure 18:
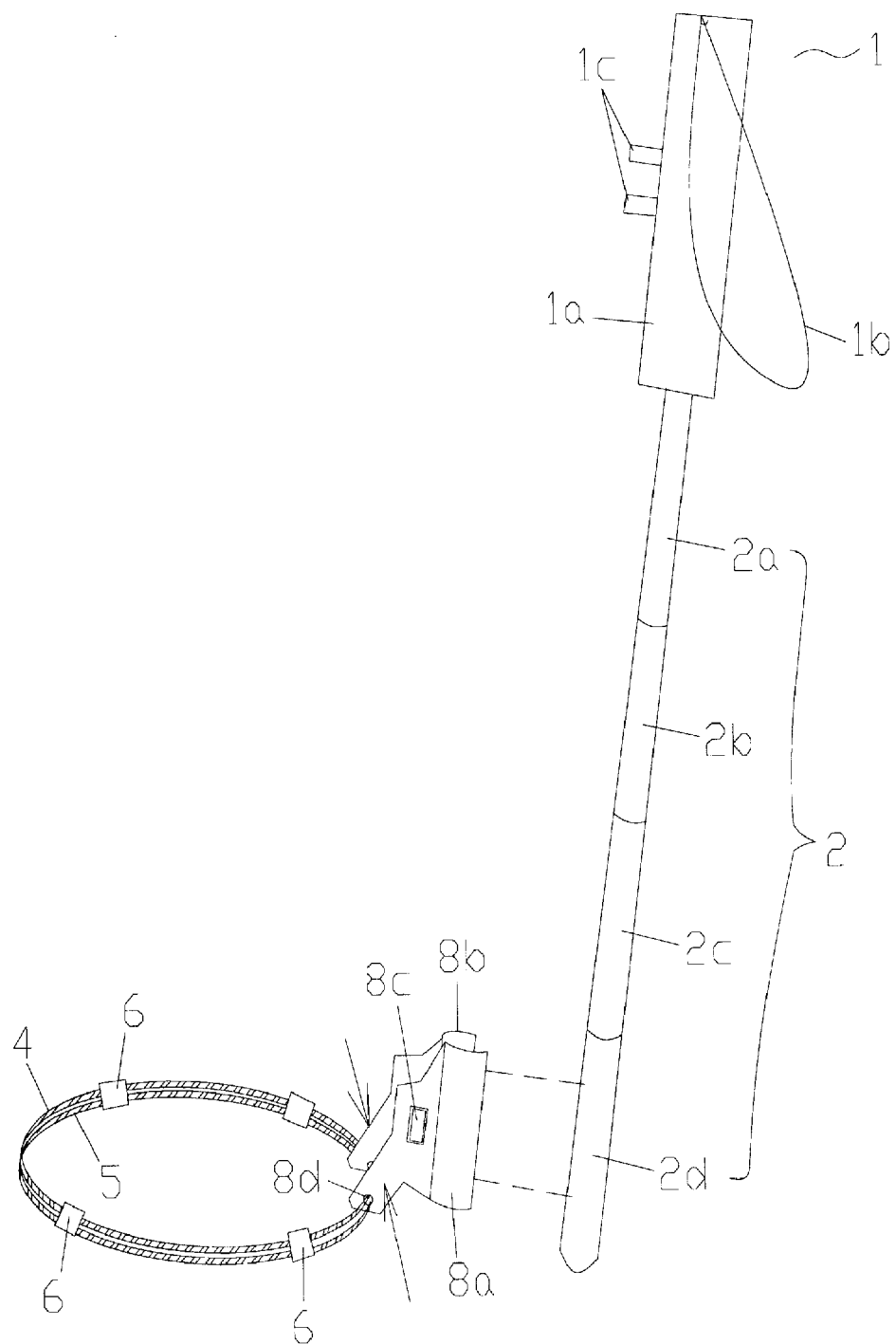
Figure 19:
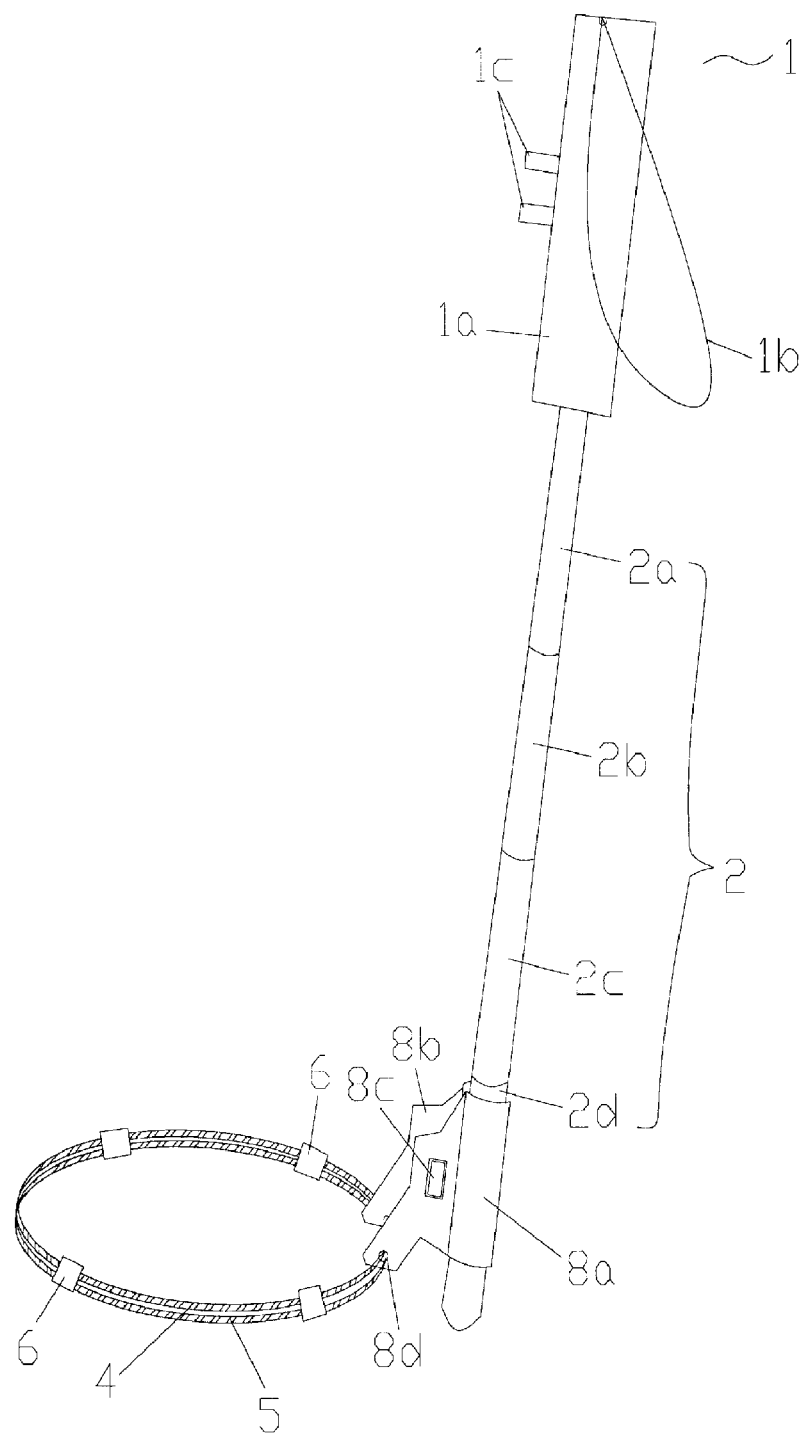

The spring-biased clip 8 is adapted to clamp onto the shaft 2 at the lower end thereof. As illustrated in FIG. 16, the spring-biased clip 8 may include two clipping portions 8a which may be cylindrical in shape and have an internal space with an internal diameter of about 1 cm. The clip 8 may include a bended metal spring 8c for biasing the two clipping portions 8a in a closed position so that the clip 8 can be securely coupled to the lowest section 2d of the shaft 2. The clip 8 may further include two hand grip portions 8b. When the two hand grip portions 8b are pressed towards each other, the two clipping portions 8a can be released from the shaft 2.

It is for the convenience of a user to adjust the clip 8 higher or lower along the shaft 2 or towards the ground when the lowest section 2d of the shaft 2 is rested on the ground. There are two holes 8d provided on the two hand grip portions 8b respectively. Their main function is to hang and hold the loops 4, 5 in an unfolded position at an angle of about 150 degree to the shaft 2. This angle can be determined by adjusting the location of the clip 8 on the shaft 2. The clip 8 may be made of plastic material or any other suitable material.

Although it has been shown and described that the loops 4, 5 with a bag 7 mounted thereon are hingedly connected to a telescopic shaft 2 for collecting dog feces during an outdoor dog walk, it is realized by a dog owner that the loops 4, 5 with a bag 7 mounted thereon can be used for indoor dog feces collection without the telescopic shaft 2.

While the dog feces collecting device disclosed in the present application has been shown and described with particular references to a number of preferred embodiments thereof, it should be noted that various other changes or modifications may be made without departing from the scope of the appended claims.

What is claimed is:

1. A dog feces collecting device comprising:
   (a) first and second loops having substantially the same size and shape, and disposed in a superimposed position;
   (b) a plurality of connecting members provided along the superimposed first and second loops and spaced apart from each other for holding the first and second loops together, and formed a plurality of bag-clamping sections each comprising two loop segments;
   (c) a bag having a rim portion inserted between the two loop segments of each bag-clamping section;
   (d) a telescopic shaft adjustable between a contracted position and an extended position, the first and second loops being hingedly connected to a lower end of the telescopic shaft and moveable between a folded position and an unfolded position;
   (e) an elongated member having an upper end and a lower end; and
   (f) a spring-biased clip having two clip portions for clipping around the lower end of the elongated member, the first and second loops being connected to the spring biased clip.

2. A pet feces collecting device comprising:
   (a) first and second loops disposed in a superimposed position;
   (b) a plurality of connecting members provided along the superimposed first and second loops and spaced apart from each other for holding the first and second loops together, and formed a plurality of bag-clamping sections each comprising two loop segments for clamping therebetween a rim portion of a bag positioned around the first and second loops;
   (c) an elongated member having an upper end and a lower end; and
   (d) a spring-biased clip having two clip portions for clipping around the lower end of the elongated member, the first and second loops being connected to the spring biased clip.

3. The device as claimed in claim 2, wherein the first and second loops are formed by two plastic rods.

4. The device as claimed in claim 2, wherein the first and second loops are formed by two steel wires.

5. The device as claimed in claim 2, wherein the first and second loops are formed by a single plastic rod or steel wire bent into two loops.

6. The device as claimed in claim 2, wherein the first and second loops are flexible.

7. The device as claimed in claim 2, wherein the first and second loops have substantially the size and shape.

8. The device as claimed in claim 2, wherein the first and second loops are circular in shape.

9. The device as claimed in claim 8, wherein the first and second loops have a diameter of about 25 mm to about 60 mm.

10. The device as claimed in claim 2, wherein the first and second loops are oval in shape.

11. The device as claimed in claim 2, wherein the connecting members are in the form of metal rings.

12. The device as claimed in claim 2, wherein the connecting members are spaced equidistantly apart from each other along the superimposed first and second loops.

13. The device as claimed in claim 2, comprising four connecting members and three bag-clamping sections.

14. The device as claimed in claim 2, wherein the bag is a plastic T-shirt bag having two handles.

15. The device as claimed in claim 2, wherein the first and second loops being hingedly connected to the lower end of the elongated member and moveable between a folded position and an unfolded position.

16. The device as claimed in claim 15, wherein the elongated member comprises a plurality of telescopic tubes adjustable between a contracted position and an extended position.

17. The device as claimed in claim 15, wherein two finger grip portions having two openings respectively through which ends of the first and second loops pass and mount, and a spring for biasing the pair of clip portions in a closed position.

18. The device as claimed in claim 15, further comprising a first hinge member fixed to the lower end of the elongated member, and a second hinge member to which ends of the first and second loops coupled, the first and second hinge members are hingedly connected together by a pin extending through concentric bores of the first and second hinge members transverse to the elongated member.

19. The device as claimed in claim 15, further comprising a stopper for limiting the movement of the first and second loops at the unfolded position.

20. The device as claimed in claim 15, wherein the lower end of the elongated member is adapted to rest on the ground when the first and second loops are in the unfolded position.

21. The device as claimed in claim 15, wherein the first and second loops are disposed at an angle of about 150 degrees with respect to the elongated member when the first and second loops are in the unfolded position.

22. The device as claimed in claim 15, further comprising a handle mounted at the upper end of the elongated member.

23. The device as claimed in claim 22, further comprising a hanging rope attached to the handle.

24. The device as claimed in claim 22, further comprising a pair of projections formed on the handle for positioning the first and second loops in the folded position where the first and second loops dispose adjacent and generally parallel to the elongated member.

25. A method of collecting dog feces comprising the steps of:
   (a) providing first and second loops having substantially the same size and shape, and disposed in a superimposed position, a plurality of connecting members being provided along the superimposed first and second loops and spaced apart from each other for holding the first and second loops together, and formed a plurality of bag-clamping sections each comprising two loop segments;
   (b) providing a bag having an open end and a closed end;
   (c) placing the first and second loops into the bag through the open end;
   (d) pushing the closed end of the bag towards a central position generally parallel to and at a distance from a central line that bisects the first and second loops until the open end of the bag hang over the side of the first and second loops;
   (e) inserting a rim portion of the bag between the two loop segments of each bag-clamping section;
   (f) providing a telescopic shaft having an upper end and a lower end;
   (g) providing a spring-biased clip having two clip portions for clipping around the lower end of the telescopic shaft; and
   (h) connecting the first and second loops to the spring-biased clip.

26. The method as claimed in claim 25, wherein the inserting step comprising the step of inserting the rim portions of the bag between the first and second loops at the bag-clamping sections by a hand.

27. The method as claimed in claim 25, wherein the inserting step comprising the step of inserting the rim portions of the bag between the first and second loops at the bag-clamping sections by a thin object.

28. The method as claimed in claim 25, further comprising the steps of (i) pulling two handles of the bag away from the first and second loops thereby releasing the clamped rim portions of the bag from the bag-clamping sections after feces collection; (ii) tying one or more knots with the two handles of the bag to close the bag; and (iii) disposing the closed bag in a litter container.

29. The method as claimed in claim 25, further comprising the steps of (i) adjusting the telescopic shaft to a suitable length; (ii) holding the upper end of the telescopic shaft with one hand; and (iii) positioning the first and second loops, which is hingedly connected to the lower end of the telescopic shaft, underneath the anus of the dog.

30. The method as claimed in claim 29, further comprising the step of holding the telescopic shaft an angle of about 30 degrees to about 80 degrees with respect to the ground.

31. The method as claimed in claim 29, further comprising the step of holding the telescopic shaft and standing at a position at an angle of about 45 degrees with respect to the tail of the dog.

32. The method as claimed in claim 29, further comprising the step of providing a first hinge member fixed to the lower end of the telescopic shaft, and a second hinge member to which ends of the first and second loops coupled, the first and second hinge members being hingedly connected together by a pin extending through concentric bores of the first and second hinge members transverse to the telescopic shaft so that the first and second loops automatically drops to the unfolded position and stops by a stopper defined by the first hinge member.

33. The method as claimed in claim 29, further comprising the steps of (i) providing two finger grip portions having two openings respectively through which ends of the first and second loops pass and mount, and a spring for biasing the pair of clip portions in a closed position; (ii) resting the lower end of the telescopic shaft on a ground; and (iii) adjusting the position of the clip on the telescopic shaft until the first and second loops are disposed in a desired unfolded position.

\* \* \* \* \*